(12) United States Patent
Salmasi et al.

(10) Patent No.: US 6,237,424 B1
(45) Date of Patent: May 29, 2001

(54) ELECTROMAGNETIC FLOWMETER HAVING LOW POWER CONSUMPTION

(75) Inventors: Zareh Soghomonian Salmasi; Wu Jin, both of Luton; Ronald David Gregg, Milton Keynes; Gerard MacManus, Slip End; Craig Timothy Howarth, Hitchin, all of (GB)

(73) Assignee: ABB Metering Limited, Bedfordshire (GB)

( * ) Notice: Subject to any disclaimer, the term of this patent is extended or adjusted under 35 U.S.C. 154(b) by 0 days.

(21) Appl. No.: 09/419,334

(22) Filed: Oct. 15, 1999

Related U.S. Application Data

(63) Continuation of application No. PCT/GB98/01199, filed on Apr. 24, 1998.

(30) Foreign Application Priority Data

Apr. 25, 1997 (GB) .................................................. 9708539

(51) Int. Cl.[7] ................................. G01F 1/60; G01F 1/58
(52) U.S. Cl. ...................................... 73/861.17; 73/861.11
(58) Field of Search ........................... 73/861.08, 861.11, 73/861.12, 861.13, 861.16, 861.17

(56) References Cited

U.S. PATENT DOCUMENTS

| | | | | |
|---|---|---|---|---|
| 4,409,846 | * | 10/1983 | Ueno ................................. | 73/861.17 |
| 4,470,309 | * | 9/1984 | Wada ................................. | 73/861.12 |
| 4,825,703 | * | 5/1989 | Kubota .............................. | 73/861.12 |
| 4,881,413 | * | 11/1989 | Georgi et al. ..................... | 73/861.12 |
| 5,426,984 | * | 6/1995 | Rovner et al. .................... | 73/861.17 |
| 5,747,700 | * | 5/1998 | Wood ................................ | 73/861.12 |
| 5,767,418 | * | 6/1998 | Davis ................................ | 73/861.12 |
| 5,895,864 | * | 4/1999 | Wang et al. ...................... | 73/861.12 |

* cited by examiner

Primary Examiner—Harshad Patel
Assistant Examiner—Jagdish Patel
(74) Attorney, Agent, or Firm—Hodgson Russ LLP (57) ABSTRACT

An electromagnetic flow meter and method of operating the same. There is provided a flow measurement duct, a magnetic circuit including pole pieces for generating a magnetic field in fluid flowing in a direction in the duct across the direction of flow, and an electrical circuit including at least one sensing electrode for measuring a voltage thereby induced in the fluid to provide an output indicative of the flow. The method comprises measuring a series of pairs of outputs of the electrical circuit, each pair of outputs comprising an output when the magnetic field is present and an output when the magnetic field is absent, and determining from the measured series of pairs of outputs whether fluid is present or absent in the duct.

29 Claims, 9 Drawing Sheets

≤9° AT INFLECTION

ELECTROMAGNETIC FLOWMETER HAVING LOW POWER CONSUMPTION

This appln is a cont of PCT/GB98/01199 filed Apr. 24, 1998.

The present invention relates to an electromagnetic flowmeter, in particular to a battery-powered electromagnetic flowmeter, primarily but not exclusively designed for domestic applications.

FIELD OF THE INVENTION

An electromagnetic flowmeter is used to measure the flow rate of a conductive medium, such as water, through a flow tube. An electromagnetic flow meter, such as that described, for example, in United Kingdom patent no. 2 081 449, comprises a magnetic circuit for developing a magnetic field vector in a plane normal to the direction of flow of fluid in the flow tube.

As fluid flows through the flow tube, a voltage is induced in the fluid subjected to the magnetic flux and in a direction orthogonal to both the direction of fluid flow and the magnetic flux. The induced voltage $V_i$ is detected by a pair of electrodes disposed in the flow tube, where $V_i$ is related to the magnetic field strength B and the velocity v of fluid flowing in the flow tube by the expression $$V_i = B \times I.v.k$$

where I is the separation of the electrodes and k is a sensitivity factor dependent upon the geometry of the flow tube. By measuring the magnitude and polarity of the induced voltage $V_i$, the magnitude and direction of the velocity of the flow of fluid through the flow tube, and therefore the flow rate, may be calculated.

DESCRIPTION OF PRIOR ART

Conventionally, various combinations of permanent magnets and electromagnetic systems are used to create either a constant or an alternating magnetic field of known magnitude. Such electromagnetic flow meters have high electrical power requirements for the reproduction of a required high magnetic field vector across the flow tube, and consequently employ a mains driven excitation circuit. An external power supply thus is required, and the cost of running such a flow meter is significant over time.

SUMMARY OF THE INVENTION

The preferred embodiment of the present invention seeks to provide a flow meter with a very low power consumption, which can if desired be driven by an internal battery for many (eg. 8 to 10) years. Such a meter is particularly suited for installation in large numbers in domestic water supply networks, and requires only periodic reading of the water consumed either by site visit or preferably by remote data logging or polling.

A first aspect of the present invention provides a method of a operating an electromagnetic flowmeter comprising a flow measurement duct, a magnetic circuit for generating a magnetic field in fluid flowing in the duct across the direction of flow, and an electrical circuit for measuring a voltage thereby induced in the fluid as indicative of the flow, the method comprising measuring an output of said electrical circuit in the absence of said magnetic field and determining therefrom the presence or absence of fluid in the duct.

This aspect of the present invention extends to an electromagnetic flow meter comprising a flow measurement duct, a magnetic circuit for generating a magnetic field across fluid flowing in the duct, an electrical circuit for measuring a voltage thereby induced in the fluid and for deriving a flow measurement therefrom and characterised by the electromagnetic flow meter sensing the presence or absence of fluid in the duct from an output of the electrical circuit when the generating magnetic circuit is inactive. Preferably the electrical circuit is adapted to identify noise signifying that the duct is empty of said fluid.

The detection of flow voids (empty tube events), which often is necessary to meet the requirements of water utilities, thus can be achieved in power-efficient manner.

The electrical circuit may be arranged to measure said voltage for short periods of time separated by relatively long intervals, the frequency of occurrence of such periods being such that the flow measured by the electrical circuit during said periods is representative of the flow during the relatively long intervals. In the example of a battery powered domestic meter, this can substantially reduce the power consumption of the meter.

Additionally, the electrical circuit may be arranged to measure said voltage during some of said periods when the magnetic circuit is inactive, whereby to identify said noise.

The flow meter may additionally comprise a processor for varying the duration of said intervals according to the measured flow rate, and/or according to the variation in the measured flow rate. Thus, in another aspect of the present invention, an electromagnetic flow meter comprises an electromagnetic flow meter comprising a flow measurement duct, a magnetic circuit for generating a magnetic field across fluid flowing in the duct, an electrical circuit for deriving a flow measurement from a voltage thereby induced in the fluid, and characterised in that the magnetic circuit is configured to generate the magnetic field for short periods of time, separated by relatively long intervals, the frequency of occurrence of such periods being such that the flow measured by the electrical circuit during said periods in representative of the flow during the relatively long intervals, the flow meter further comprising a processor for varying the duration of said intervals according to the measured flow rate, and/or according to the variation in the measured flow rate.

Preferably, the electrical circuit is arranged to derive a series of time-spaced flow measurement signals from voltages thereby induced in the fluid flow, each signal comprising a component representative of the flow and a variable DC component unrelated to the flow, the flow meter further comprising a processor for determining the DC component of a said signal and for adjusting the DC level of a subsequent said signal in response thereto. This can ensure that drift in the DC level of the flow measurement signal due to electrochemical effects is corrected so that the input dynamic range of subsequent signal-processing circuitry is not exceeded. Otherwise the signal would be clipped or clamped, resulting in measurement errors.

Preferably, the processor predicts the DC component of the subsequent signal from a plurality of values of the DC component obtained from the previous signal. Thus, in yet another aspect of the present invention, an electromagnetic flow meter comprises a flow measurement duct, a magnetic circuit for generating a magnetic field across fluid flowing in the duct, an electrical circuit for deriving a series of time-spaced flow measurement signals from voltages thereby induced in the fluid flow, the signal comprising a component representative of the flow and a variable DC component unrelated to the flow, and a processor for determining the DC component of a said signal and for adjusting the DC level of a subsequent said signal in response thereto, the processor predicting the DC component of the subsequent signal from a plurality of values of the DC component obtained from the previous signal.

Preferably, the first flow measurement signal comprises a plurality of pulses, the processor predicting the DC component of the subsequent signal by applying an algorithm to values of the DC component each obtained from the respective said pulse.

Conventionally, the magnetic circuits of electromagnetic flowmeters are formed from high impurity mild steels, containing a relatively impurity-contaminated ferrite structure. However, these materials possess extremely poor magnetic properties, such as low initial and incremental permeabilities at low and elevated flux density levels respectively, low or undefined remanence flux density, high or undefined coercivity, undeveloped or random crystalline texture, random or undefined power loss and permeability anisotropy, and high power losses at low induction and excitation frequencies.

Power loss is mainly composed of three components: (1) current loss which depends of the excitation frequency, electrical resistivity, the peak flux density and the material thickness of the magnetised body;

(2) hysteresis loss which depends on the composition, processing history, metallurgical processing and conditioning of the material, the composition, the post and pre processing of the alloy, the heat treatment and annealing of the material which collectively influence the impurity levels and the mechanism of precipitation and contamination of the metallic structure. The main factors associated with the hysteresis loss are the size of the ferrite grain, the alignment and the condition of the ferrite grains, the precipitant and contaminants within the grains and the grain boundaries, the alignment of the recrystallised grains, and the extent of the grains with respect to the material thickness;

(3) eddy current losses which may be attributed to many factors including the non-sinusoidal movement of domain wall in the material and domain wall damping.

In a preferred embodiment of the present invention, the magnetic circuit comprises first and second pole pieces for directing the magnetic field across the measurement duct, the pole pieces being of a material exhibiting preferential crystalline anisotropy. The crystalline anisotropy may be aligned substantially along the longitudinal axis of said pole pieces.

This can enable an efficient magnetic circuit with low losses to be provided which is capable of being powered by an on-board battery for a considerable period of time. Thus, in another aspect of the present invention, an electromagnetic flowmeter comprises a flow measurement duct, magnetic circuit for generating a magnetic field across fluid flowing in the duct, an electrical circuit for deriving a flow measurement from a voltage thereby induced in the fluid, and characterised in that magnetic circuit comprises pole pieces for directing the magnetic field across the measurement duct, the pole pieces being of a material exhibiting preferential crystalline anisotropy.

This aspect of the present invention extends to a method of manufacturing pole pieces for use in a magnetic circuit of an electromagnetic flowmeter comprises the steps of forming the pole pieces from magnetically soft material, and annealing the pole pieces whilst simultaneously applying a magnetic field to the pole pieces to induce preferential crystalline anisotropy in the pole pieces. The annealing is preferably performed in a (preferably moist) decarburizing atmosphere. The annealing may performed at a temperature of at least 780° C. for at least 2 hours.

The pole pieces are preferably of a magnetically soft material, preferably containing 0.03% wt or less of carbon.

The magnetic circuit may further comprise a magnetising coil disposed on the first pole piece only, and a housing containing the pole pieces and the coil and through which the flow measurement duct passes, the pole pieces and the housing forming a magnetic circuit.

Preferably, the magnetic circuit is configured to generate the magnetic field in alternating directions, the flow meter further comprising an element for suppressing noise in a signal representative of the flow induced electromagnetically by a change in direction of the magnetic field.

This can moderate the rate of change of the magnetic field when it changes direction, reducing induced noise which otherwise could overload the flow signal detection and processing circuits. Alternatively or in addition it suppresses the effect of any ripple in the electric current producing the magnetic field. Thus, in yet another aspect of the present invention, an electromagnetic flow meter comprises a flow measurement duct, a magnetic circuit for generating a magnetic field across fluid flowing in the duct, an electrical circuit for deriving a flow measurement from a voltage thereby induced in the fluid, characterised in that the magnetic circuit is configured to generate the magnetic field in alternating directions, and comprising an element for suppressing noise in a signal representative of the flow induced electromagnetically by a change in direction of the magnetic field.

Preferably, the suppression element comprises a conductive member in which eddy currents are generated, said eddy currents moderating the rate of change of the magnetic field. The conductive member comprises a disc of diameter substantially equal to that of the coil, and the disc may be at an axial end of the coil facing towards the second pole piece. The conductive member may encircle a said pole piece. Thus, the suppression element may comprise a conductive ring encircling a pole piece adjacent the flow measurement duct.

Preferably, the flow measurement duct comprises a flow measurement portion of smaller cross-sectional area than another portion thereof, the said portions being joined by a convergent or divergent section of the duct the walls of which are defined by reverse transition curves with a point of inflection therebetween. Preferably, the measurement section has at least one pair of opposing parallel planar walls.

Thus, another aspect of the present invention provides an electromagnetic flow meter comprising a fluid flow duct with a flow measurement portion of smaller cross-sectional area than another portion thereof, the said portions being joined by a convergent or divergent section of the duct the walls of which are defined by reverse transition curves with a point of inflection therebetween.

Alternatively, the flow measurement duct comprises a flow measurement portion of smaller cross-sectional area than another portion thereof, the said portions being joined by a convergent or divergent section of the duct the walls of which at any location axially thereof have an included angle of not more than nine degrees, the walls of the convergent or divergent section being defined by one or more transition curves. Preferably, the measurement section is of substantially rectangular cross-section, and, if so, the said another portion may be of circular cross-section.

Thus, yet another aspect of the present invention provides an electromagnetic flow meter comprising a fluid flow duct with a flow measurement portion of smaller cross-sectional area than another portion thereof, the said portions being joined by a convergent or divergent section of the duct the walls of which at any location axially thereof have an included angle of not more than nine degrees, the walls of the convergent or divergent section being defined by one or more transition curves.

This can provide an efficient passage of the fluid through the measuring portion of the meter.

Preferably, the flow meter comprises a battery connected to the electrical circuit for powering the same.

The preferred embodiment of the present invention will now be described, purely by way of example only, with reference to the accompanying drawings, in which:

BRIEF DESCRIPTION OF THE INVENTION

DETAILED DESCRIPTION OF THE INVENTION

Figure 1:
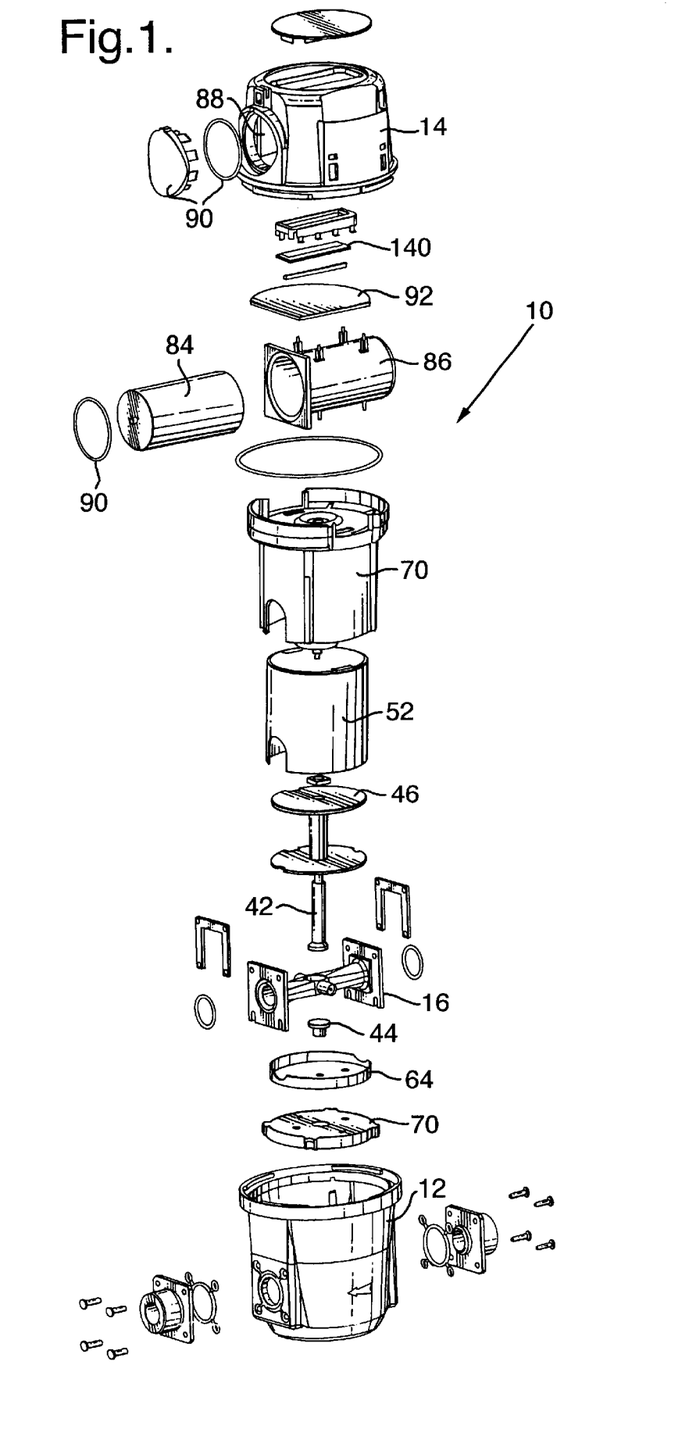
FIG. 1 shows an exploded view of an electromagnetic flowmeter according to an embodiment of the present invention.

Referring to FIG. 1 an electromagnetic flowmeter 10 according to a preferred embodiment of the present invention comprises a meter body 12 and meter cover 14 of plastics material. Because as described hereafter the flowmeter operates at low levels of magnetic field and induced voltage, it is susceptible to external sources of interference. In order to protect the electromagnetic flowmeter from external interference, the body 12 and cover 14 may be coated by plasma discharge/ionisation, controlled vapour deposition, magnetron sputtering deposition or spray coating to provide an EMC/RFI shield.

The external surfaces of the body 12 and cover 14 may be treated to render them vapour-impermeable in order to prevent the ingress of water vapour.

A flow tube 16 (FIG. 2) through which, in use, conductive fluid flows is disposed in the meter body 12. The flow tube 16 includes a pair of non-magnetic, non-permeable flanges 18 at the inlet and outlet ends of the flow tube 16 to enable the flow tube to be connected to the meter body 12 by means of fastening plates 19. Seals 20, for example O-rings, are disposed between the flow tube 16 and the meter body 12 to prevent the leakage of fluid from the joint formed between the flow tube 16 and the meter body 12.

As shown in FIGS. 3A to 3E, the flow tube 16 comprises a tapered non-magnetic, non-conducting, non-permeable tube eg of a plastics material preferably treated to render it impervious to water seepage under pressure. The tube has a circular cross-section at its inlet and outlet ends 24, blended by contraction (converging) and diffusion (diverging) portions to an intermediate portion 26 of rectangular cross-section through which the rate of flow of fluid through the meter is determined. The portion 26 of the flow tube having a rectangular cross-section is hereafter referred to as the measurement duct.

Figure 3A:
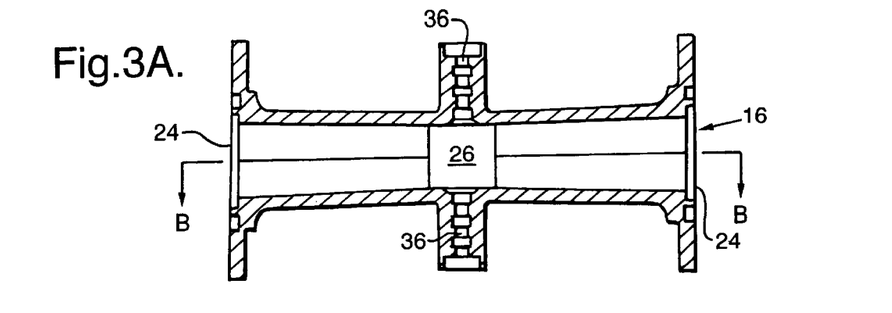
FIG. 3A shows a horizontal cross-sectional view of the flow tube of the flowmeter shown in FIG. 1.

The flow tube 16 is shaped to achieve a uniform flow profile through the measurement duct for a range of fluid flow rates in the flow tube 16 with minimum variation in the pressure of the fluid leaving the flow tube at the outlet 24. The width-to-height (aspect) ratio of the duct 26 may be adjusted to achieve the desired flow dynamic characteristics for the electromagnetic measurement of the flow rate, but generally will be in the range 1.5 to 2.3. In this preferred embodiment, the flowmeter is designed to withstand a constant continuous working pressure of 16 bar, with a pressure drop across the meter being less than 0.5 bar at a flow rate of 3000 liters per hour.

More specifically, the rectangular section of the measurement duct 26 has a cross section of approximately one third of the area of the inlet and outlet portions 24. Tis reduced area results in a relatively high-speed flow which improves the sensitivity of the meter. The rectangular shape of the measurement duct also promotes a flow regime which is relatively uniform across its width (apart from boundary layer effects) for a wide range of flow rates leading to a more nearly linear calibration characteristic for the meter.

Figure 3B:
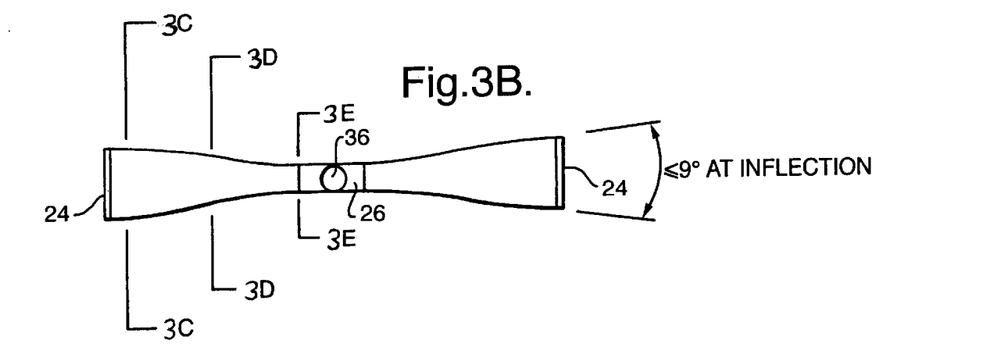
FIG. 3B is a simplified vertical section of the flow tube, on line B—B of FIG. 3A.
Figure 3C:
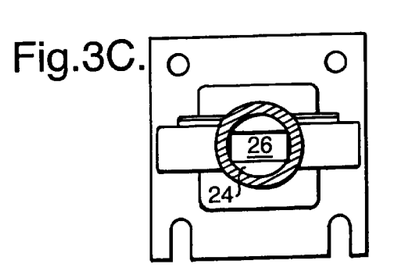
FIGS. 3C, 3D and 3E are sections through the flow tube on lines 3C, 3D and 3E of FIG. 3B.
Figure 3D:
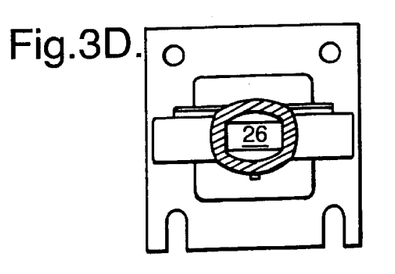
Figure 3E:
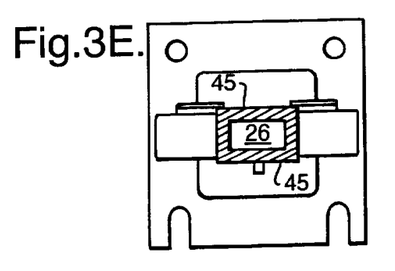

Referring to FIG. 3C, the upper and lower sides of the rectangular section 26 are wide chords of the circular-section flow tube (i.e. close to its diameter) at the inlet and outlet ends 24. Consequently almost all of the reduction and subsequent increase in flow area is achieved by blending the top and bottom of the section as shown in FIGS. 3D and 3E.

This blending is effected by reverse transition curves as shown in FIG. 3B, that is to say the degree of convergence or divergence is initially very small at station C, increases to a maximum at a point of inflection in the centre of the convergent or divergent section (approximately at station D) and then decreases again to a small value at the end of the section, station E.

The maximum rate of convergence or divergence at the point of inflection is such that the included angle of the walls (or more precisely of tangents thereto) is nine degrees or less.

The blending of the vertical sides of the section is much less pronounced. For these sides, whilst transition curves are preferable, it may be sufficient merely to adopt a straight line blending. Of course if a flow measurement section is chosen which differs markedly from the diameter of the inlet and outlet sections in both horizontal and vertical dimensions, transition curves should be adapted for the sides as well as for the top and bottom of the section.

A divergent flow tube as described can avoid excessive turbulence and cavitation in the divergent section. If the meter is not required to handle bi-directional flow the convergent may be made shorter but in general it is preferable to make the flow tube symmetrical about its centre for case of assembly as well as hydrodynamic efficiency.

Figure 4:
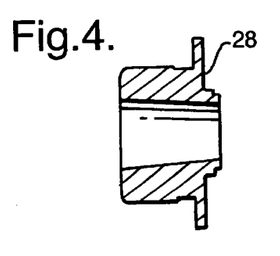
FIG. 4 shows a cross-sectional view of a spudend shown in FIG. 1.

The flowmeter is adapted to be interposed between flanged upstream and downstream portions of a water supply pipe or other fluid line. Flanged metal spudends 28 are attached to the meter body 12 by means of spudend fasteners 30. The bore of each spudend 28 may be profiled as shown in FIG. 4 so as to form a extension of the diffusion and contraction sections of the flow tube, thereby allowing a lower ratio of change of section to be achieved. This may be particularly useful if the diameter of the pipe is significantly larger than the width of the rectangular measuring section 26. Then the diameter can be gradually reduced to that of the flow tube at station C, FIG. 3C, before blending to the rectangular section commences.

The spudends 28 are adapted to be bolted to the flanges of the pipe. Seals 32 are disposed between each spudend 28 and the meter body 12 to prevent the leakage of fluid from the joint formed between the respective spudend 28 and the meter body 12.

Figure 2:
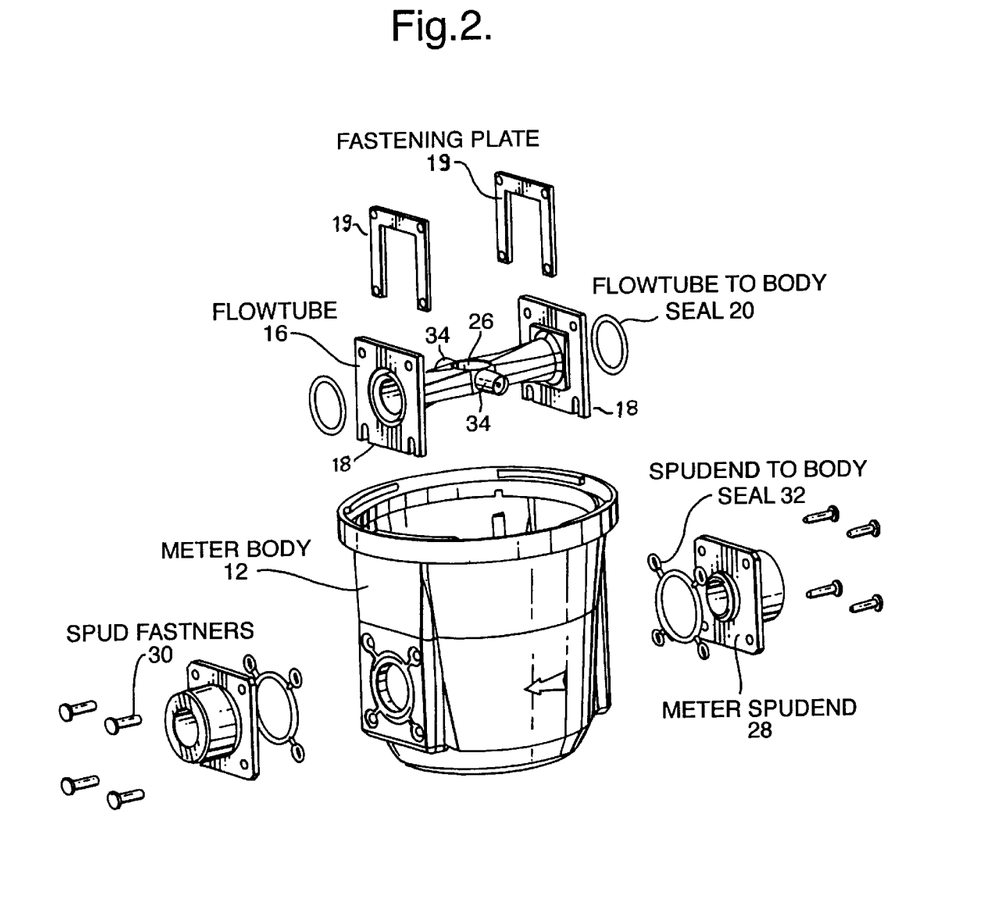
FIG. 2 shows an exploded view of the flow dynamic components of the flowmeter shown in FIG. 1 in more detail.

A pair of electrode housings 34 are provided in the flow tube 16. With reference to FIGS. 2 and 3, one electrode 36 is disposed in each electrode housing 34 so that the electrodes 36 are disposed orthogonally across the direction of flow of fluid in said flow tube and orthogonal also to magnetic field. The electrodes may be formed from any suitable non-contaminating conducting material, such as stainless steel, plated copper or brass. The electrodes 36 may have rectangular, elliptical or a circular cross-section, and have a height substantially equal to the height of the measurement duct 26. The material from which the electrodes are formed may be subjected to cleansing and surface treatments, such as passivation, to permit the formation of a uniform oxide layer on the contact surface of the electrodes exposed to the fluid flowing in the flow tube 16. Such surface treatments can reduce the susceptibility of the electrodes to electrochemical effects such as polarisation, and ensure a consistent electrode impedance from meter to meter.

The electromagnetic flowmeter is powered by means of an internal replaceable or a rechargeable battery (FIG. 6.), in this case a single D-size 15 amp-hour capacity lithium thionyl chloride cell 84.

Figure 6:
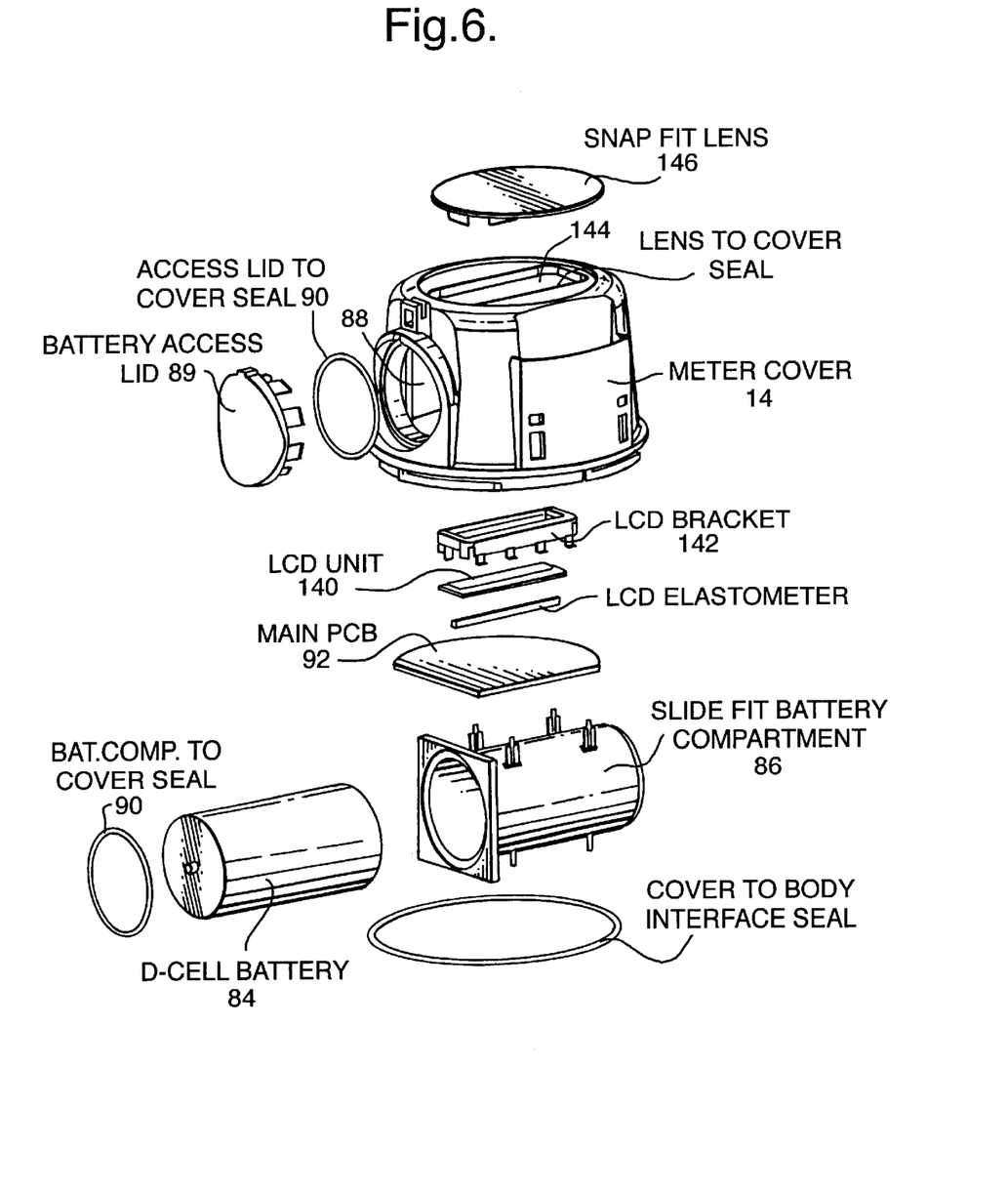
FIG. 6 shows an exploded view of the upper portion of the flowmeter shown in FIG. 1 in more detail.

The battery is housed in a battery compartment 86 in the meter cover 14, with its longitudinal axis parallel to the flow tube. The battery compartment is designed to A allow the battery to be accessed and replaced easily with the meter in situ. Thus, an aperture 88 in the battery compartment 86, closed by a water proof and tamperproof access lid and seals 90, allows the battery to be removed from the meter.

Above the battery compartment is mounted a printed circuit board 92 comprising a coil driver circuit and signal processing circuitry (FIGS. 8, 9 and 11) and a liquid crystal display 140, visible through a window 146 in the cover 14.

Compared to conventional mains-powered electromagnetic flowmeters, the power available for this meter is much smaller, and the magnetic circuit, the coil drive circuit and the signal processing circuitry of the meter are designed to compensate for this.

Figure 5:
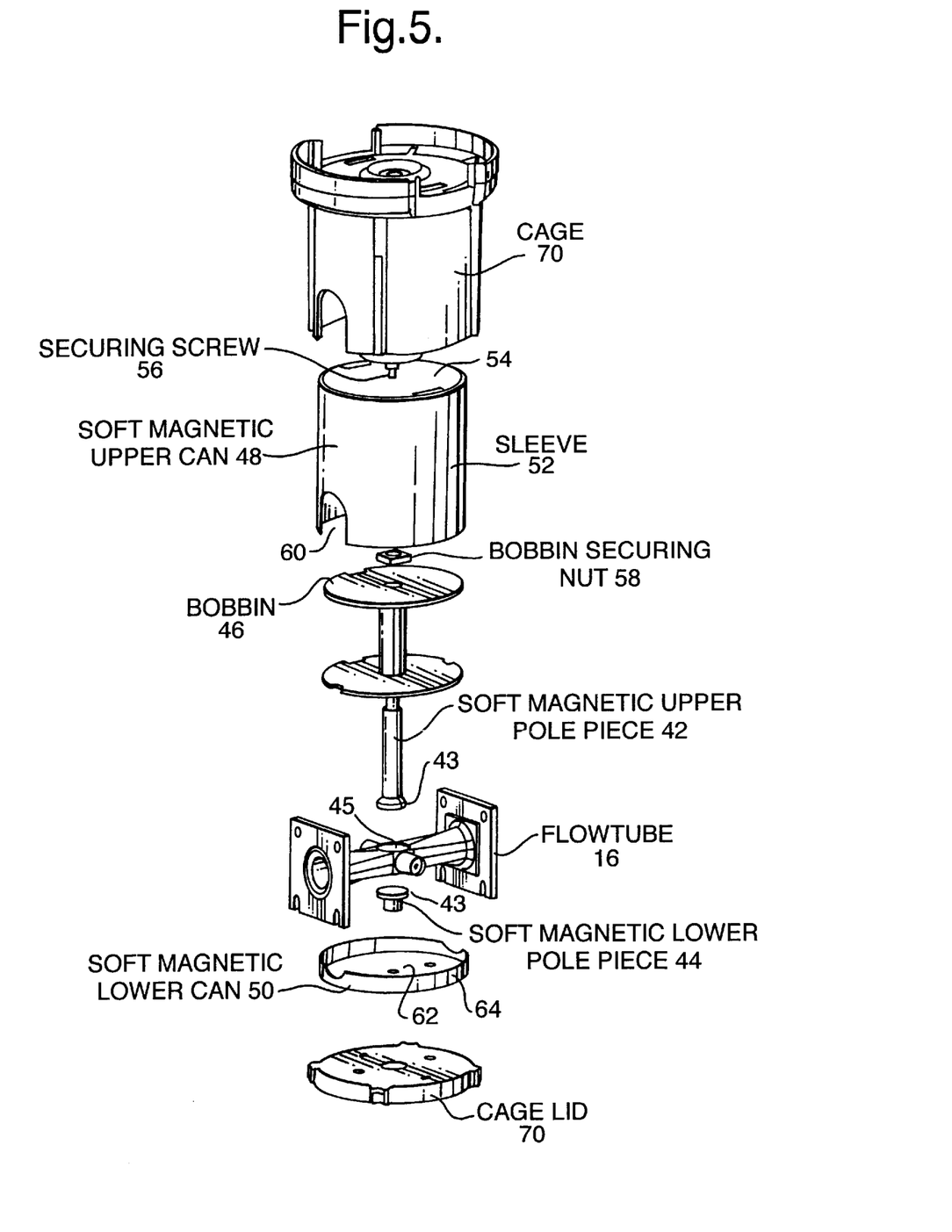
FIG. 5 shows an exploded view of the magnetic circuit of the flowmeter shown in FIG. 1 in more detail.

With particular reference to FIG. 5, the magnetic circuit is asymmetric about the measurement duct 26. It comprises upper and lower pole pieces 42, 44 within a cylindrical enclosure formed by a upper can 48 and lower can 50. An excitation coil (not shown) is wound around a bobbin 46 disposed around the upper pole piece 42, which is significantly longer than the pole piece 44.

The pole pieces 42 and 44 are formed from magnetically soft material having superior magnetic characteristics to materials conventionally used in electromagnetic flowmeters. The material from which the pole pieces are formed comprises a low carbon, low impurity purified magnetically permeable, magnetically soft material such as electrical steel. The pole pieces may be machined from a cast or deep-drawn rod having a diameter typically between 10 and 20 mm, preferably 125 mm or alternatively may be cast into the desired shape. Table 1 shows typical impurity concentrations, expressed as weight percentages (wt %) of the pole pieces prior to any subsequent heat treatment.

TABLE 1

| | C | Si | Mn | S | P | Al | Cu | Cr |
|---|---|---|---|---|---|---|---|---|
| Wt % | 0.025–0.032 | 0.03–0.04 | 0.18–0.25 | 0.01–0.02 | 0.005–0.01 | up to 0.002 | 0.01 to 0.04 | 0.013 to 0.03 |

The purified steel composition for the rod from which the pole pieces are formed reduces the detrimental effects of elements such as carbon and manganese and compounds such as carbides, oxides, nitrides and sulphides in the ferrite structure of the fully recrystallised material. The components are heat-treated in a decarburizing atmosphere to promote the required re-crystallization in the ferrite grain structure, by releasing stored plastic strain energy from the material, which in turn is a precursor for developing the optimum magnetic properties of the material. The homogeneous re-crystallization of the material and the uniform development of the re-crystallized ferrite grains leads to improved functioning of the flowmeter.

After machining the pole pieces from the rod, or casting the pole pieces, the pole pieces are decarburized and annealed at a temperature between 800° C. and 825° C. for between 2 and 4 hours in a moist atmosphere of hydrogen and nitrogen, typically containing 70–80% hydrogen, at a dew point of 25° C. to 35° C., to reduce the carbon and other impurities resident in the magnetic structure of the metal. Decarburizing at such a dew point moderates the rate of oxidation of the low carbon material, prompted by the concentrations of silicon and aluminium in the material, thus controlling the thickness of the thin oxide layer formed on the surface of the material during annealing. After the annealing, the cooling rate is controlled to be no more than a maximum of 60° C. per hour in the sane atmosphere to prevent the formation of any discoloured oxide layers on the surfaces of the material.

To accelerate the decarburization process, the bulk material may be doped with transition metals such as Zr (within the range of 0.01 to 0.23 wt %), Nb (within the range of 0.012 and 0.29 wt %) and Ti (within the range of 0.011 to 0.22 wt %) to assist the removal of excessive nitrides and carbides.

The annealing is preferably magnetic annealing. Specifically, whilst the temperature is ramped up to the annealing temperature, a current is caused to flow through a coil surrounding the furnace in which the pole pieces are disposed, the rod being disposed substantially with its axis parallel to that of the coil. The uniform magnetic vector so provided is maintained during annealing and cooling of the material, and results in crystalline anisotropy in the ferrite grain structure, aligned with the axis of the pole piece. Typical field strengths are 100 to 10000 A/m encompassing the whole bulk of the component being treated.

Table 2 shows typical impurity concentrations, expressed as weight percentages (wt %) of the rod after annealing.

TABLE 2

|      | C | Si | Mn | S | P | Al | Cu | Cr |
|------|---|----|----|---|---|----|----|----|
| Wt % | 0.006–0.020 | 0.024–0.049 | 0.17–0.24 | 0.01–0.012 | 0.003–0.005 | 0.003–0.004 | 0.018–0.032 | 0.015–0.019 |

The poles pieces may have a circular, rectangular or other shaped facing surfaces. It is also preferred that the pole pieces 42 and 44 are machined to be concave in a direction orthogonal to the longitudinal axis thereof. This acts to converge the created magnetic flux and thus to increase the magnetic potential difference and profile gradient of the resultant bi-directional magnetic field created in the measurement duct 26, specifically by channelling flux on to a plane perpendicular to the direction of flow of fluid in the measurement duct 26.

After annealing, the upper and lower pole pieces are subject to various surface treatments in order to protect them from atmospheric corrosion and contamination and delayed magnetic ageing. These treatments include electroplating, electrocoating and spray lacquering.

Each of the pole pieces 42, 44 has an enlarged face portion 43 (FIG. 5) which registers on a flat seating 45 in the flow tube. The periphery of each face 43 is formed by a copper ring in which eddy currents are generated to suppress high frequency ripple which may be present the magnetic field, as described further hereafter with reference to FIG. 10.

The field is generated by energising the magnetic circuit by a single excitation coil 82 driven by coil drive circuit 80 (FIG. 7, 8) disposed around the upper pole piece 42. In the embodiment shown in FIG. 1, the coil is carried by bobbin 46. The bobbin is formed by injection moulding a polymer, such as PPS polymer comprising 40% glass fibre. In this embodiment, the bobbin has a height of approximately 37.5 mm and the diameter of the flanges of the bobbin is 55.5 mm.

The coil has a large current density relative to its dimensions, in order to achieve an acceptably high density magnetomotive force. The coil typically comprises 4000 to 4700 turns of copper wire, preferably approximately 4500 turns of wire, having a gauge between 0.335 and 0.355 mm. With the wire wound around the bobbin so that the external diameter of the coil is substantially equal to the diameter of the flanges, there are typically 60 to 63 layers of wire, with 72 to 75 turns per layer. The coiled wire is bonded to the bobbin by means of adhesive.

Figure 7:
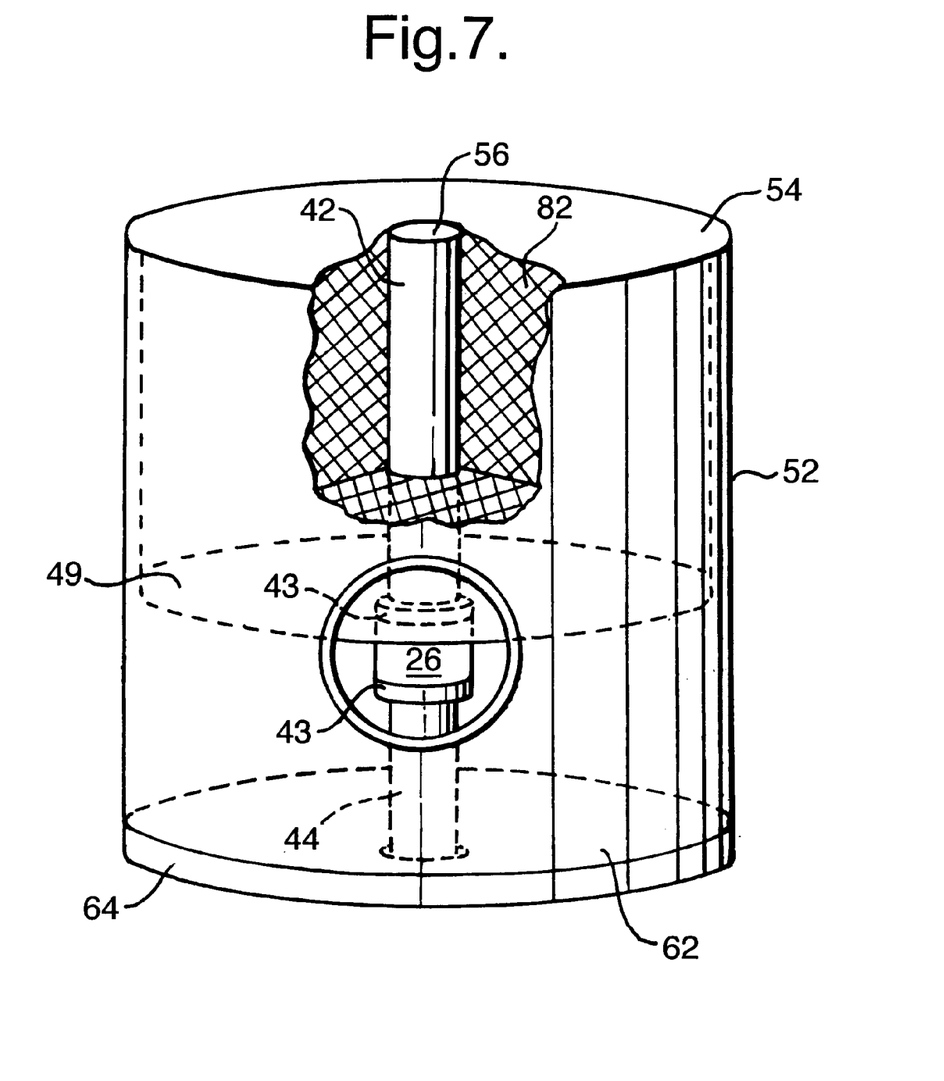
FIG. 7 shows an alternative form of the magnetic circuit and energising coil of the flowmeter shown in FIG. 1.

As an alternative to winding the wire of the coil around a bobbin, self-bonding wire may be wound directly around the upper pole piece 42 as shown in FIG. 7. A further alternative is to pre-form the coil and adhere the coil directly on to the upper pole piece 42. As a yet further alternative, the excitation coil may comprise three separate cascaded concentric coils connected in series.

The upper can 48 comprises a cylindrical sleeve 52 and an end enclosure disc 54 having a rim (not shown). The disc 54 has a diameter which is slightly greater than the internal diameter of the sleeve 52; to attach the disk 54 to the sleeve 52 the sleeve is elastically deformed radially outwardly to increase the internal diameter to allow the sleeve 52 to fitted over the disk. Upon relaxing the sleeve, 52, the sleeve contracts so that the internal walls of the sleeve grip tightly the rim of the disk 54.

With the bobbin 46 disposed on upper pole piece 42, the upper can 48 is disposed over coil and pole piece 42. The upper pole piece 42 is attached to the disc 54 by means of a ferrous securing screw or rivet 56. The screw or rivet may be of the same material as the pole pieces. A nut or rubber spacing washer 58 may be provided to locate securely the bobbin 46 relative to the upper pole piece 42. A pair of apertures 60 (only one shown in FIG. 3) allow the flow tube 16 to pass through the sleeve 52.

The lower can 50 comprises an end closure disc 62 having a rim 64. The lower can is disposed over the lower pole piece and the lower pole piece is attached to the disc 62 by means of a ferrous securing screw or rivet (not shown). The lower can is then attached to the upper can, rim 64 being gripped securely by the inner surface of the sleeve 52.

The cylindrical enclosure formed by the upper and lower cans thus mechanically locates the upper pole piece, lower pole piece and excitation coil. FIG. 7 shows the cylindrical enclosure disposed around the upper and lower pole pieces.

The upper and lower cans are formed from rolled magnetically soft sheet material, for example low-silicon, non-oriented electrical steel with a gauge of 0.50 to 0.65 mm. The sleeve 52 is formed by deep drawing the sheet material and the discs 54 and 62 are formed by punching the sheet material. The apertures 60 in the sleeve 52 arc formed in the sleeve 52 by punching holes in the sleeve. The material is subjected to similar heat and finishing treatments as the pole pieces.

Tables 3 and 4 show typical impurity concentrations, expressed as weight percentages (wt %) of the sheet material before and after annealing.

TABLE 3

|            | C     | Si   | Mn    | S     | P     | Al    | Cu    |
|------------|-------|------|-------|-------|-------|-------|-------|
| Min. Wt %  | 0.012 | 0.10 | 0.254 | 0.009 | 0.007 | 0.019 | 0.006 |
| Max. Wt %  | 0.041 | 0.3  | 0.472 | 0.019 | 0.012 | 0.03  | 0.017 |

TABLE 4

|      | C           | Si          | Mn        | S            | P          | Al          | Cu            |
|------|-------------|-------------|-----------|--------------|------------|-------------|---------------|
| Wt % | 0.002–0.004 | 0.008–0.35  | 0.25–0.56 | 0.011–0.013  | 0.01–0.08  | 0.03–0.05   | 0.004–0.025   |

The can is housed in a plastic casing 70 (FIG. 1) which locates the assembled magnetic circuit within the casing 12, 14. The surface of the casing 70 may be treated similarly to the casing 12, 14 to shield the magnetic circuit against external electromagnetic interference.

Figure 10:
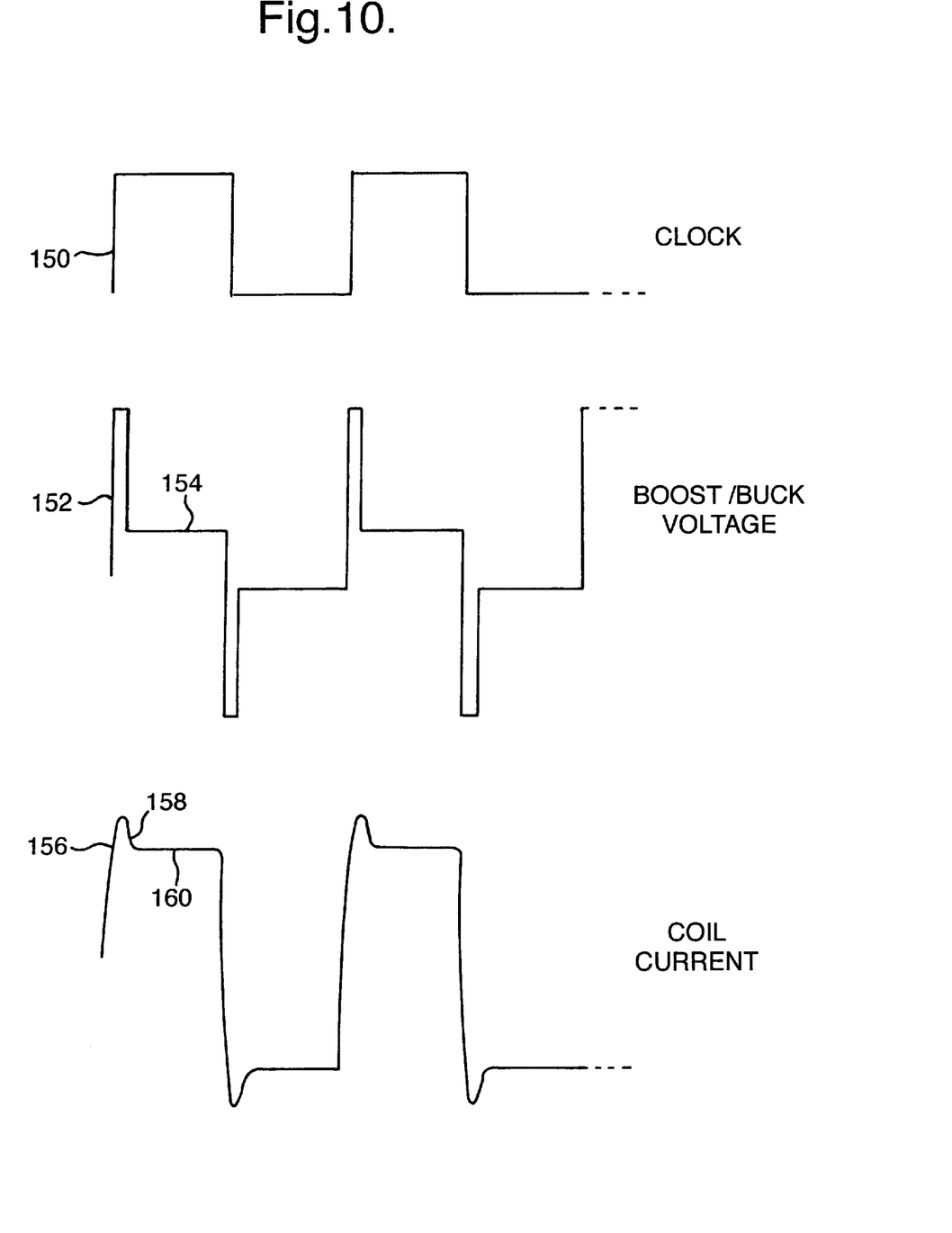
FIG. 10 shows waveforms utilised in the flowmeter.
Figure 11:
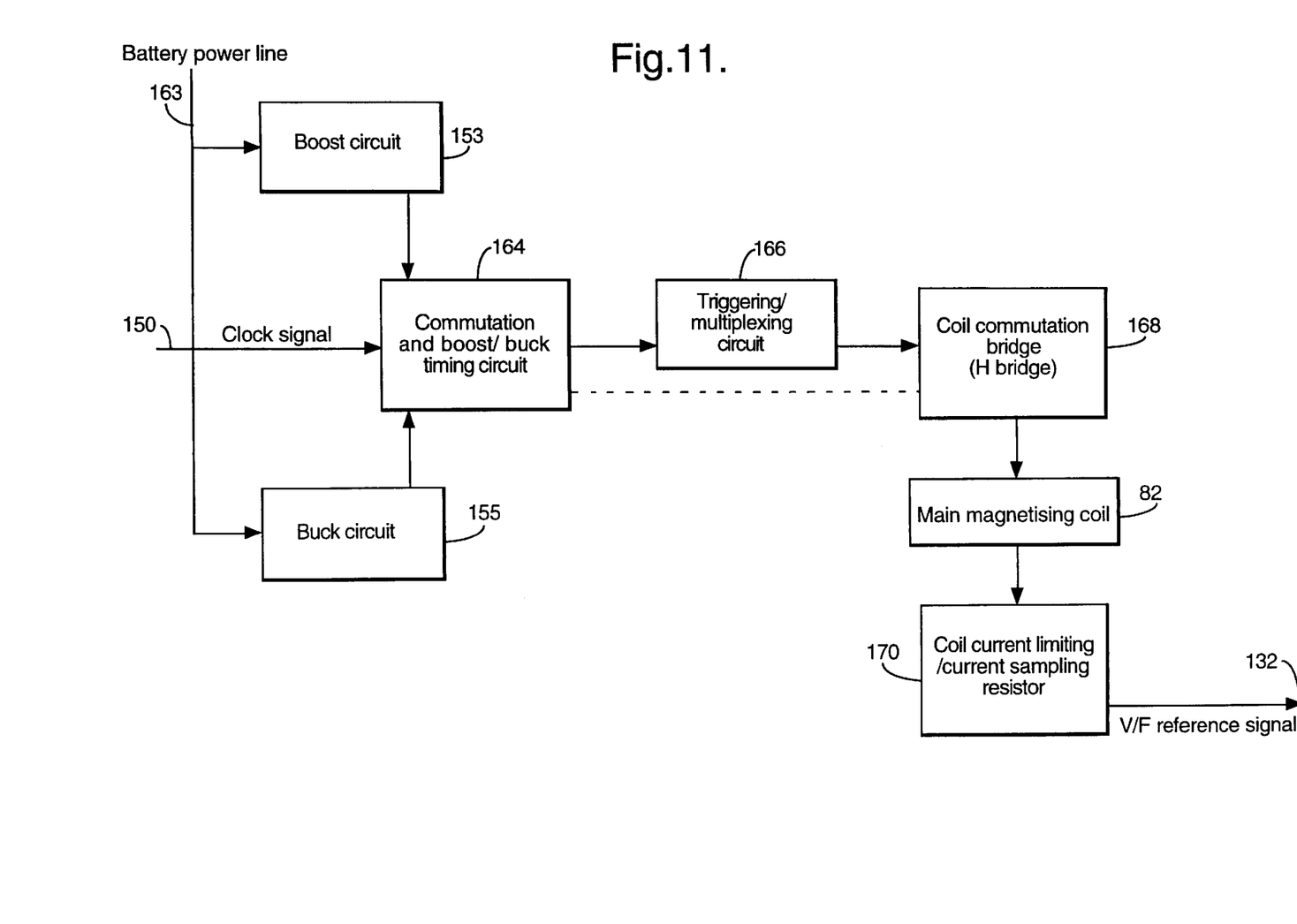
FIG. 11 shows schematically the magnetic field generating circuit of the flowmeter.

As described hereafter with reference to FIGS. 10 and 11, the coil drive circuit 80 is adapted to supply DC currents with alternating polarities to the excitation coil 82, thus generating a bi-directional (alternating) magnetic field orthogonally to the fluid flow in the flow tube 16. A bi-directional field is necessary to prevent ionisation and electrochemical influences acting on the electrodes 36; with a unidirectional magnetic field in the measurement duct 26, the voltage induced between the electrodes also is unidirectional. As a result particles in the fluid are polarised and tend to adhere to the surface of the electrodes 36, which can lead over time to partial or complete blockage of the duct 26, creating measurement errors and premature meter failure.

Accordingly, the excitation current is commutated, thus creating a bidirectional magnetic field. The steady-state magnitude of the current is typically between 3 mA and 7 mA. In this embodiment the excitation current is supplied for periods of 60 ms at intervals of a few seconds, each 60 ms period consisting of three 20 ms half cycles. This low duty cycle assists in ensuring extended battery life, and the measurement interval is sufficiently short for the flow measured in successive 60 ms measurement windows to be representative of the flow in the interval between the windows. The duration of the measurement cycles (20 ms) is such that 50 Hz ground interference may be matched within the measurement frequency spectrum and thus rejected in the successive measurement and filtering stages.

As the commutation of the excitation current takes place rapidly, the resultant rate of change of the magnetic field may result in a large transient induced voltage between the electrodes 36. This large voltage which otherwise would saturate the signal processing circuitry of the meter, is excluded by sampling the induced voltage signal only after the transient voltage has decayed.

In order to damp the rate of change of the magnetic field especially in the region of the upper pole piece 42, a conductive disc 49, formed preferably from aluminium or copper, is disposed on the end of the bobbin facing the lower pole piece 44. The disk typically has a uniform thickness of between 50 and 100 microns, in this embodiment 76 microns. An earthing lead is connected to the disk. The fast changing magnetic field induces eddy currents in the disc 49, which create a opposing field in the disc, damping the net rate of change of the magnetic field in the end of the upper pole piece 42, thus reducing the noise created by the change in direction of the field.

In operation alternating magnetic flux passes around the magnetic circuit constituted by the upper pole piece 42, the fluid in the measurement duct 26, the lower pole piece 44, disc 62, sleeve 52 and disc 54. Depending on the excitation current and the geometry of the magnetic circuit, the magnetic field is in the range from 2.5 mT to 5.0 mT, typically about 4.5 mT.

Figure 8:
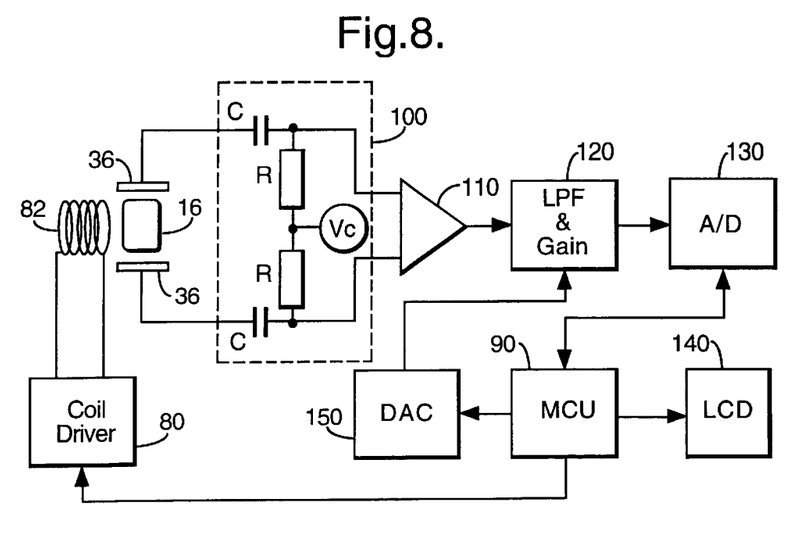
FIG. 8 shows a circuit diagram of the flow meter.

FIG. 10 illustrates the waveform of the coil excitation signal supplied by the coil driver circuit 80 shown in FIG. 8 and (in more detail) FIG. 11. The drive circuit is controlled by a clock signal provided from a supervisory microprocessor 90 (FIG. 8). At intervals of a few seconds, the coil is energised for three consecutive half cycles of 20 ms duration each. At the commencement of the first of the half cycles 150, a voltage pulse 152 of 12 v and 2 ms duration is applied, from a boost circuit 153 (FIG. 11). This is immediately followed by a 0.6 v voltage pulse 154 from a buck circuit 155. Because the coil is highly inductive, the boost voltage produces a transient current spike 156 followed by a recovery 158 after which the current settles to a steady value 160. The spike and rebound occupy some 3 to 5 ms, the steady current 160 being of some 15 to 18 ms duration, during which period only the voltage induced across the electrodes 36 is sampled as described hereafter.

For accurate flow measurement it is important that the magnetic field produced by the steady current 160 is substantially constant. The current 160 may have a ripple arising in the buck circuit; the effect of this in the magnetic field is suppressed by opposing eddy currents generated in the peripheral copper rings of the pole piece faces 43.

In the second half cycle the voltage applied to the coil is commutated by an H-bridge 168 (FIG. 11) to provide a 12 v boost and 0.6 v buck of opposite polarity to that of the first half cycle. The current waveform in the coil is likewise inverted. In the third half cycle the applied voltage is commutated again, and the voltage and current are the same as in the first half cycle.

In each half cycle the purpose of the boost pulse is to establish a substantial magnetic flux in the correct direction as quickly as possible. In the absence of a boost pulse, the highly inductive nature of the circuit would result in the magnetic field building up only slowly to the constant value necessary for the flow measurement to be valid. Then either the duration of the cycle would have to be longer, or a higher (constant) driving voltage would be necessary. Either would result in greater power consumption from the battery.

Referring to FIG. 11 the coil drive circuit 80 consists of the boost circuit 153 and buck circuit 155 which receive a 3.6 v input via line 163 from the battery and respectively boost and reduce that voltage to 12 v and 0.6 v respectively. The circuits 153, 155 are quiescent except when triggered by a timing circuit 164 under the control of the supervisory microprocessor 90. Each contain voltage stabilisation functions so that the output voltages (and especially that of the buck circuit 155) remain constant as the battery ages.

The timing circuit supplies the buck and boost voltages to a multiplexer 166 whereat they are combined sequentially and applied to the coil commutation bridge 168 (also controlled by the timing circuit 164) in which the polarity of the second half cycle is reversed, and all three are then applied sequentially to the coil 82. A resistor 170 is provided in series with the coil 82 to limit the induced current which otherwise would be excessive during the boost phase of the excitation cycle. The voltage 132 developed across the resistor 170 (which has a low temperature coefficient and is thus substantially temperature-stable) is utilised as a reference signal for an analogue to digital converter 130 (FIGS. 8 and 9) which as described hereafter utilises the signal to compensate for variations in the magnetic field in the measurement duct 26.

As fluid flows through the flow tube 16, a voltage is induced in the fluid in the measurement duct 26 subjected to the magnetic flux and is detected by electrodes 36. For low flows, the induced voltage may be as low as 0.3 $\mu$V. The induced voltage sensed by the electrodes 36 is supplied to the signal processing circuitry via screened coaxial cables with elastomer based carbon or graphite loaded conductive sleeves or conventional RFI/EMC interwoven and enwrapped shielding layers, which collectively reduce the susceptibility of the signal to external electrical and magnetic interference. Each cable may alternatively be housed in a respective shielding tube, or both cables may be housed in a single tube. The tube is of a nickel-based alloy such as Mumetal, or of aluminum with a surrounding nickel-based foil.

Figure 9:
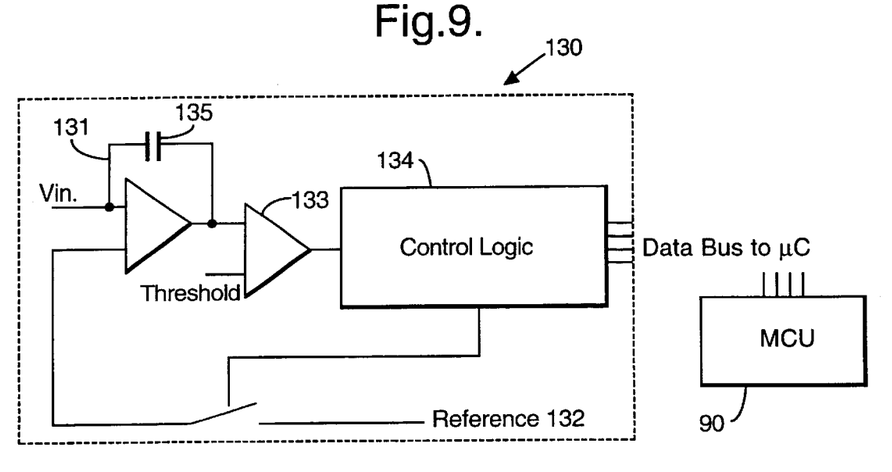
FIG. 9 shows a circuit diagram of an analogue to digital converter of the flowmeter circuit shown in FIG. 8.

The signal output from the electrodes 36 to the signal processing circuitry shown in FIGS. 8 and 9. This circuitry is energised synchronously with the coil driver circuit under the control of the clock signal from the microprocessor 90. The sign from the electrodes 36 is taken via an RC coupling 100 to a differential pre-amplifier having a high common mode rejection ratio over the bandwidth of the signal spectrum and a controllable pre-set gain. In order to accommodate the differential signal within the single rail of the power supply a small common-mode voltage Vc is injected into the centre mode of the RC coupling 100.

After fixed-gain amplification of the differential signal by the pre-amplifier 110, the signal is input to a low pass filter and amplifier (ELF and gain) 120, which removes the superimposed high frequency noise from the signal and amplifies the signal further for compatibility with the limited dynamic range of the analogue-to-digital converter 130.

The amplified analogue signal is converted into a digital format by the analogue to digital converter 130 with 15 bit resolution by means of a microprocessor controlled voltage to frequency conversion technique. An example of the analogue to digital converter is shown in FIG. 9.

In the analogue to digital converter 130, the amplified and filtered signal is integrated by integrator 131 over predetermined time intervals with respect to the reference voltage 132 developed across the coil current limiting resistor 170. The integration time is set by control logic circuit 134 under the control of the microprocessor 90. The voltage 132 varies with the steady-state (buck) current passing through it. Thus, if the current varies e.g. due to a change in temperature or to the battery ageing, this is reflected in the reference voltage 132. A change in coil current results in a change in the magnetic field and hence a spurious change in the flow rate signal (voltage) input to the A/D convertor 130. By utilising the voltage 132 as the reference voltage in integrator 131 there is provided a ratiometric relationship between a change in the excitation current and signal conversion, ensuring that the integrity of the flow measurement is maintained.

The output of the integrator is a ramp which is fed to a threshold circuit 133 which discharges capacitor 135 of the integrator and emits a pulse each time a threshold voltage is attained. The resulting pulse train is counted during a set time interval by control logic circuit 134 to provide a digital conversion of the analogue flow signal, which the microprocessor 90 converts to a flow rate and/or to the total volume of fluid which has passed through the meter, for storage in a non-volatile memory and display as required by LCD 140.

The accumulated data may be transmitted to a mobile or centralised data base via an interfacing means which may include various means of radio-frequency communication at an appropriate band width using various modulation methods including FSX, PSK, and ASK The transmission protocols may be chosen as appropriate to the particular application.

The A/D converter 130 can accept only a limited dynamic range in its input signal. However the output from LPF/amplifier 120 has a variable DC level relative to a circuit ground due to electrochemical effects between the fluid in the measurement duct 26 and the electrodes 36. To maintain the DC level within acceptable limits a DC voltage is added or subtracted from the signal in LPF/amplifier 120, under the control of the microprocessor 90.

The microprocessor applies a three point non linear regressive algorithm to the flow signals $V_0$, $V_1$, $V_2$ measured during the three successive 20 ms half-cycles of FIG. 10. Because the DC voltage level varies slowly its value during one 60 ms measurement window can be used to predict its value $V_3$ during the next window two seconds later. In this particular algorithm (others may be employed)

$$V_3 = V_2 + (V_1 - V_2)^2 / (V_1 - V_0)$$

The value $V_3$ is supplied to an analogue to digital converter 150 where it is converted to a DC voltage which is applied to the LPF/amplifier 120 to adjust the DC level of its output so that it is within the dynamic range of the A/D converter 130.

The foregoing description of the operation of the signal-processing circuitry has been in the context of measuring a flowing fluid. It is necessary also to consider two other operating conditions: one when the flow tube is full of fluid but there is no flow and the other when the flow tube is empty of fluid. In accordance with the invention, the presence or absence of fluid in the duct is sensed from a series of pairs of outputs of the electrical circuit, each pair of outputs comprising an output of the electrical circuit when the magnetic circuit is active and an output of the electrical circuit when the magnetic circuit is inactive. In other words, a series of pairs of outputs of the electrical circuit are measured, each pair of outputs comprising an output when the magnetic field is present and an output when the magnetic field is absent, and from the measured series of pairs of outputs it is determined whether fluid is present or absent in the duct. The voltage across the electrodes 36 will have one of three characteristic states; although the transitions between these states is not abrupt they are sufficiently marked for a distinction still to be made by means of fuzzy logic algorithms in the microprocessor 90.

In the first state, fluid flow is passing through the measurement duct 26. Apart from the flow signal, the voltage monitored across the electrodes 36 contains also the noise arising from electrochemical effects of the fluid, and flow noise. The former presents a slow varying characteristic, and is removed by the three point non-linear regressive algorithm, and the latter is in general proportional to the flowrate.

In the second state, the flow tube 16 is filled with stationary fluid, and the voltage monitored is dominated by the electro-chemical effect described above.

The third state is when the measurement duct is empty. Then the electrodes 36 are not in contact with the conductive fluid, and the impedance between them is very high. They also are exposed to stray electrical and magnetic fields which now become significant. The voltage sensed across the electrode 36 thus varies markedly from measurement to measurement but in an inconsistent or unpredictable manner, and is independent of whether the coil 82 is powered-up.

Based upon the nature of the meter readings three criteria are adopted for determining the filling status of the flow tube as follows:

(i) The consistency of meter readings. If the consistency is poor; an empty tube event may have already occurred.

(ii) Noise level in the flow tube (tube noise) when the excitation coil is not energised. If the noise is high, an empty tube event may have already occurred.

(iii) Correlation between the tube noise and the recorded flowrate. Since the noise is in general proportional to the flowrate, if the two are out of proportion (ie the noise at the measured flowrate is significantly higher than its should be) an empty tube event may have already occurred.

It is apparent that each of these three criteria is responsive to the transition between full and empty tube status ie. situations in which the flow tube is only part-full or the flowing fluid contains voids, either of which lead to metering inaccuracies. In order to cope with these transitional characteristics in implementing these criteria, a fur logic technique is employed. In order to test the filling status of the tube a number of consecutive meter readings prior to the test are recorded. Also recorded is the meter reading obtained in the absence of an excitation coil current. This is achieved during one of the 60 ms periods by the microprocessor energising the signal processing circuitry but not the coil 82. Typically, this may be done once in every eight to thirty 60 ms cycles. The instantaneous flowrate as measured in the last test, the consistency of the flow rate, and the tube noise are each treated as an independent logic variable. Based upon these meter readings, logic values are individually assigned to these variables according to the inherent relationship between them. These variables are then processed collectively to generate an updated logic function value, which is compared with a set of predefined fuzzy thresholds, thus to determine whether or not the measurement tube is full.

The microprocessor 90 is also utilised to effect further battery saving by adjusting the interval between the 60 ms measurement periods. When the flowrate is high, or is varying significantly from measurement to measurement, the measuring periods are commanded at relatively short intervals. If the measured flowrate is zero or consistent at a relatively low rate, then the interval is extended, for example doubled.

Each feature disclosed in the description, and/or the claims and drawings may be provided independently or in any appropriate combination. In particular a feature of a subsidiary claim may be incorporated in a claim for which it is not dependent.

What is claimed is:

1. A method of operating an electromagnetic flow meter comprising a flow measurement duct, a magnetic circuit including pole pieces on opposite sides of the duct, a path for magnetic flux and a coil for generating a magnetic field in fluid flowing in a direction in the duct across the direction of flow, and an electrical circuit including a pair of sensing electrodes and a signal progressing circuit branch for measuring a voltage thereby induced in the fluid to provide an output indicative of the flow, the method comprising the steps of measuring a series of pairs of outputs of said electrical circuit, each pair of outputs comprising an output when said magnetic field is present and an output when said magnetic field is absent, and determining from the measured series of pairs of outputs whether fluid is present or absent in the duct.

2. An electromagnetic flow meter comprising a flow measurement duct, a magnetic circuit including pole pieces on opposite sides of the flow measurement duct, a structure operatively connected to the pole pieces and providing a path for magnetic flux, and a coil disposed on one of the pole pieces for generating a magnetic field across fluid flowing in the duct, an electrical circuit including a coil drive circuit branch connected to the coil, a pair of sensing electrodes in spaced relation and in fluid communication with the duct and a signal processing circuit branch connected to the electrodes for measuring a voltage induced in the fluid, for deriving a flow measurement therefrom, and for sensing presence or absence of fluid in the duct from a series of pairs of outputs of the electrical circuit, each pair of outputs comprising an output of the electrical circuit when the magnetic circuit is active and an output of the electrical circuit when the magnetic circuit is inactive.

3. An electromagnetic flow meter according to claim 2 wherein the electrical circuit responds to noise signifying that the duct is empty of said fluid.

4. An electromagnetic flow meter according to claim 3 wherein the electrical circuit measures said voltage for short periods of time separated by relative long intervals, such periods having a frequency of occurrence such that the flow measured by the electrical circuit during said periods is representative of the flow during the relatively long intervals.

5. An electromagnetic flow meter according to claim 4 wherein the electrical circuit measures said voltage during some of said periods to identify said noise, when the magnetic circuit is inactive.

6. An electromagnetic flow meter according to claim 5, further comprising a processor operatively associated with said electrical circuit for varying duration of said intervals according to a measured flow rate, and/or according to a variation in the measured flow rate.

7. An electromagnetic flow meter according to claim 2, wherein the electrical circuit derives a series of time-spaced flow measurement signals from voltages induced in the fluid, each signal comprising a component representative of the flow and a variable DC component unrelated to the flow, the electrical circuit further comprising a processor for determining the DC component of said signal and for adjusting DC level of a subsequent said signal in response to said DC component.

8. An electromagnetic flow meter according to claim 7 wherein the processor predicts the DC component of the subsequent signal from a plurality of values of the DC component obtained from a previous signal.

9. An electromagnetic flow meter according to claim 8 wherein the flow measurement signal comprises a plurality of pulses, the processor predicting the DC component of the subsequent signal by applying an algorithm to values of the DC component each obtained from a respective pulse.

10. An electromagnetic flow meter according to claim 2, wherein the pole pieces are of a material exhibiting preferential crystalline anisotropy.

11. An electromagnetic flow meter according to claim 10 wherein the crystalline anisotropy is aligned with a direction of the magnetic field in the pole pieces.

12. An electromagnetic flow meter according to claim 11, wherein the pole pieces are of a magnetically soft material.

13. An electromagnetic flow meter according to claim 10, wherein the pole pieces are of a magnetically soft material.

14. An electromagnetic flow meter according to claim 13 wherein the pole pieces are of a material containing 0.03% wt or less of carbon.

15. An electromagnetic flow meter according to claim 2, wherein the structure comprises an enclosure containing the pole pieces, the coil, and the flow measurement duct.

16. An electromagnetic flow meter according to claim 2, wherein the sole pieces are shared to generate the magnetic field in alternating directions, the magnetic circuit further comprising a conductive element on at least one of the pole nieces for suppressing noise in a signal representative of flow induced electromagnetically by a change in direction of the magnetic field.

17. An electromagnetic flow meter according to claim 16 wherein the element for suppressing comprises a conductive ring encircling one of the pole pieces adjacent to the flow measurement duct.

18. An electromagnetic flow meter according to claim 16 wherein the conductive element comprises a conductive member in which eddy currents are generated, said eddy currents moderating rate of change of the magnetic field.

19. An electromagnetic flow meter according to claim 18, wherein the conductive member encircles said at least one of the pole pieces.

20. An electromagnetic flow meter according to claim 18, wherein the conductive member comprises a conductive ring encircling one of the pole pieces adjacent the flow measurement duct.

21. An electromagnetic flow meter according to claim 18, wherein the conductive member comprises a disc of diameter substantially equal to the diameter of the coil.

22. An electromagnetic flow meter according to claim 21, wherein the disc is at an axial end of the coil facing towards another one of the pole pieces.

23. An electromagnetic flow meter according to claim 21, wherein the conductive member encircles said at least one of the pole pieces.

24. An electromagnetic flow meter according to claim 2, wherein said flow measurement duct comprises a flow measurement portion and a flow tube having walls, said flow measurement portion having a smaller cross-sectional area than a portion of the flow tube, said portions being joined by a convergent or divergent section of the flow tube walls which are defined by reverse transition curves with a point of inflection therebetween.

25. An electromagnetic flow meter according to claim 24, wherein the measurement portion has at least one pair of opposing parallel planar walls.

26. An electromagnetic flow meter according to claim 2, wherein said flow measurement duct comprises a flow measurement portion and a flow tube having walls, said flow measurement portion having a smaller cross-sectional area than a portion of the flow tube, said portions being joined by a convergent or divergent section of the flow tube walls which at any location axially thereof have an included angle of not more than nine degrees, the walls of the convergent or divergent section being defined by one or more transition curves.

27. An electromagnetic flow meter according to claim 26, wherein the measurement portion is of substantially rectangular cross-section.

28. An electromagnetic flow meter according to claim 27, wherein said portion is of circular cross-section.

29. An electromagnetic flow meter according to claim 2, further comprising a battery connected to the electrical circuit.

* * * * *

UNITED STATES PATENT AND TRADEMARK OFFICE
CERTIFICATE OF CORRECTION

PATENT NO.    : 6,237,424 B1
DATED         : May 29, 2001
INVENTOR(S)   : Salmasi et al.

It is certified that error appears in the above-identified patent and that said Letters Patent is hereby corrected as shown below:

<u>Column 17,</u>
Line 5, "sole" should be -- pole --.
Line 5, "shared" should be -- shaped --.

Signed and Sealed this

Fifth Day of March, 2002

Attest:

Attesting Officer

JAMES E. ROGAN
*Director of the United States Patent and Trademark Office*